Feb. 27, 1968   P. B. WASHBURN   3,370,854
DIAL TUG GAME
Filed Nov. 12, 1965

PAUL B. WASHBURN
INVENTOR.

BY *Herbert J. Brown*

ATTORNEY

3,370,854
DIAL TUG GAME
Paul B. Washburn, Rte. 1, Box 87-A,
Azle, Tex. 76020
Filed Nov. 12, 1965, Ser. No. 507,508
1 Claim. (Cl. 273—134)

This invention relates to games and has reference to that type of game including a board and movable parts thereon.

The object of the invention is to provide a game for the amusement of the players.

Generally, the game is comprised of a square board, reels near the corners of the board, concentric circles on the board between the reels defining a field of play, and a cord wound on each reel and connected with a score point indicator which is moved on the field of play by operating of the reels.

In the accompanying drawing:

FIGUE 1 is a plan view of a board game according to the invention.

Figure 1:
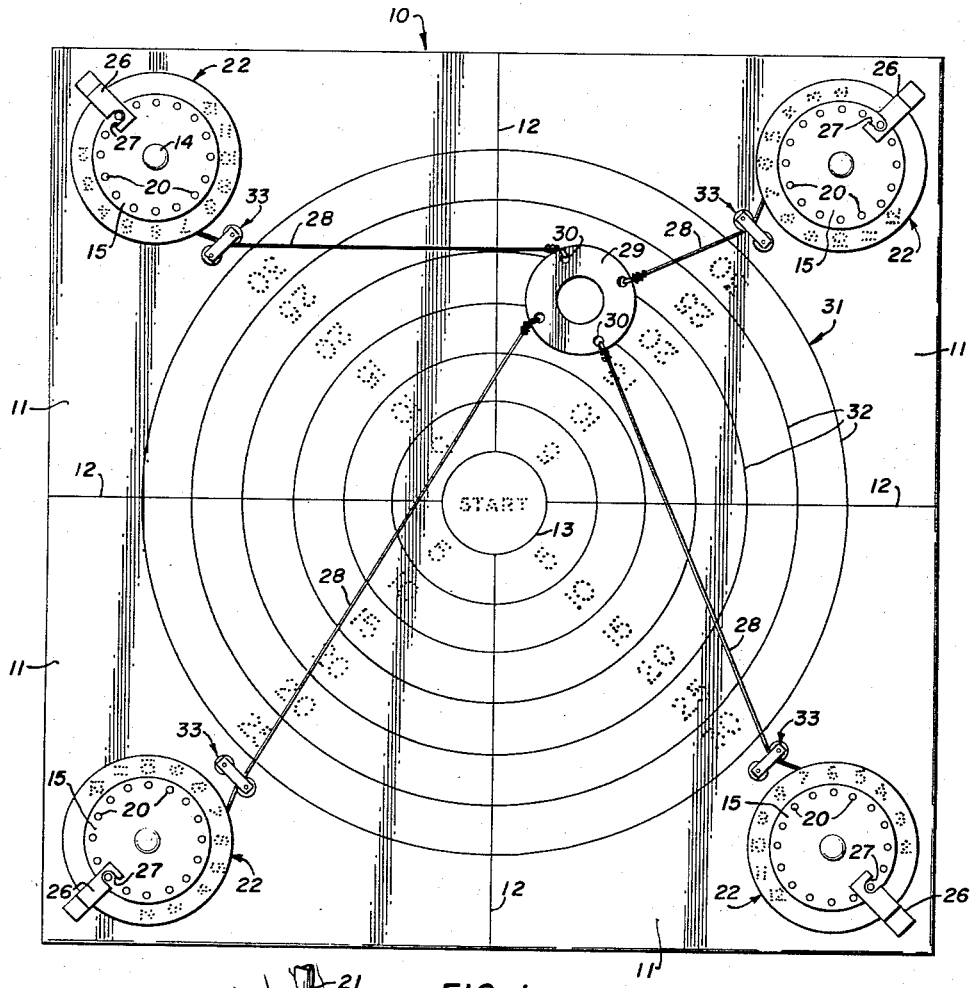
Figure 2:
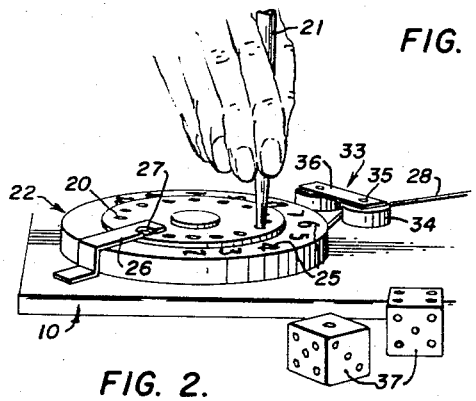
Figure 3:
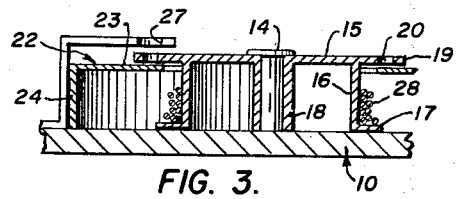

FIGURE 2 is a perspective view of a corner of the board and showing a preferred means for operating the reels, and FIGURE 3 is an enlarged fragmentary vertical sectional view of one of the reels and showing components for the operation thereof.

The form of the invention shown includes a square board 10 which is divided into quadrants 11 by intersecting lines 12. At the intersection of the lines 11, there is a small circle 13 labeled "Start." Near each corner of the board 10 there is a vertical pin 14 on which there is mounted a reel 15. As shown only in FIGURE 3, the circular wall 16 of the reel 15 has a lower flange 17 which makes contact with the surface of the board 10 and a bearing portion 18 in which the pin 14 is journaled. The upper flange 19 of each reel 10 has a number or equally spaced holes 20 therearound for rotating the reel by means of a stylus 21 as shown in FIGURE 2. Around each reel 15 and rigidly mounted on the board 10 there is a dial member 22 having a flat circular upper surface 23 supported by a circular wall 24. There are numbers 25 on the upper surface 23 of each dial 22. The spacing of the numbers 25 corresponds with the spacing of the holes 20. In the form of the invention shown there are sixteen holes 20 in each reel 15 and there are numbers two through twelve on the dial surface 23. In the appended claim the holes 20 are referred to as "indices" and the numbers 25 are referred to as "indicia." A stop 26 in the form of an angular bracket is secured to the board 10 at each corner and extends over the adjacent dial 22 and inwardly of the holes 20 in the reel 15. A notch 27 may be provided in the side of each stop to receive the stylus 21. A cord 28 is wound around each reel 15 in clockwise direction and extends outwardly through an opening, not shown, in the dial 22 where it is connected with a flat ring 29, hereinafter referred to as a score point indicator. The connection of the cords 28 with the indicator 29 is by way of four equally spaced holes 30 in the latter. The indicator 29 moves about on a circular field of play 31 comprised of equally spaced circular lines 32 concentric about the intersection of the quadrant lines 12. The spaces between the lines 32 are numbered in increments of five beginning with the space adjacent the inner circle 13.

Guides 33 for the cords 28 are provided between the dials 22 and the field of play 31 and each may consist of a spaced pair of rollers 34 mounted on pins 35 having a bar 36 connected between their upper ends.

To play the game the score point indicator 29 is first placed on the inner circle 13 and the reels are rotated in a direction so that all cords 28 are tight. The first player rolls a pair of dice 37 to determine the angle of rotation of the reel 15 assigned to him. The stylus 21 is then placed in the hole 20 opposite the number 25 corresponding with the number turned up on the dice 37. The reel 15 is then rotated in a clockwise direction by the stylus 21 until the latter contacts the stop 26. Such rotation causes the indicator 29 to move in the field of play 31. The described operation is repeated by each player in turn, and each play is scored by the position of the indicator according to the number indicated between circles 32 of the field of play 31. However, to score, the indicator 29 must be in the quadrant including the player's reel 15. Play is continued until some predetermined score is reached, or when one player has taken up all of his cord 28.

The invention is not limited to the exemplary construction herein shown and described, but may be made in various ways within the scope of the appended claim.

What is claimed is:

1. A game apparatus consisting of a board, reels rotatably mounted on a surface of said board and spaced apart to define a square, intersecting straight lines on said board dividing said square into square quadrants, spaced circular lines on said board concentric with the intersection of said straight lines defining a field of play, a score point indicator movable on said field of play, cords wound on said reels and connected with said score point indicator, equally spaced indices on and located around said reels near their peripheries, indicia on said board at least partially around each said reel, said indicia being spaced to correspond with the spacing of said indices means for rotating said reels individually, and chance controlled means for determining the angle of rotation of said reels.

References Cited

UNITED STATES PATENTS 2,976,045  3/1961  Mason _____ 273—135
3,168,314  2/1965  Washburn _____ 273—134

DELBERT B. LOWE, *Primary Examiner.*